US012572662B2

(12) United States Patent
Chen et al.

(10) Patent No.: US 12,572,662 B2
(45) Date of Patent: Mar. 10, 2026

(54) BOOT VERIFICATION METHOD AND RELATED APPARATUS

(71) Applicant: Huawei Technologies Co., Ltd., Shenzhen (CN)

(72) Inventors: Shiping Chen, Dongguan (CN); Xingsheng Qiu, Beijing (CN); Lizhong Qiao, Beijing (CN); Jiangbo Zhu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 125 days.

(21) Appl. No.: 18/483,612

(22) Filed: Oct. 10, 2023

(65) Prior Publication Data

US 2024/0119158 A1  Apr. 11, 2024

(30) Foreign Application Priority Data

Oct. 10, 2022  (CN) .......................... 202211234569.5

(51) Int. Cl.
| | |
|---|---|
| *G06F 15/177* | (2006.01) |
| *G06F 8/65* | (2018.01) |
| *G06F 9/00* | (2018.01) |
| *G06F 21/57* | (2013.01) |

(52) U.S. Cl.
CPC .............. *G06F 21/575* (2013.01); *G06F 8/65* (2013.01); *G06F 2221/034* (2013.01)

(58) Field of Classification Search
CPC .... G06F 21/575; G06F 8/65; G06F 2221/034; G06F 21/572; G06F 8/654
See application file for complete search history.

(56) References Cited

U.S. PATENT DOCUMENTS

| | | | | |
|---|---|---|---|---|
| 11,698,971 B2 * | 7/2023 | Thor | ...................... | H04L 9/3247 |
| | | | | 713/2 |
| 2007/0192610 A1 * | 8/2007 | Chun | .................... | G06F 21/575 |
| | | | | 713/176 |
| 2011/0131447 A1 * | 6/2011 | Prakash | ................ | G06F 9/4408 |
| | | | | 713/189 |
| 2016/0314295 A1 * | 10/2016 | Paaske | .................... | G06F 21/85 |
| 2017/0109533 A1 * | 4/2017 | Shah | ...................... | G06F 21/554 |
| 2020/0302063 A1 | 9/2020 | Kim | | |
| 2021/0211279 A1 * | 7/2021 | Nix | .......................... | H04L 67/34 |
| 2022/0121750 A1 * | 4/2022 | Lee | ......................... | G06F 9/4401 |
| 2022/0284104 A1 * | 9/2022 | Herberholz | .......... | G06F 21/575 |
| 2022/0405392 A1 * | 12/2022 | Nix | ........................ | H04L 9/3249 |

FOREIGN PATENT DOCUMENTS

| | | |
|---|---|---|
| CN | 103780376 A | 5/2014 |
| CN | 111488310 A | 8/2020 |
| CN | 115130143 A | 9/2022 |
| WO | 2017004828 A1 | 1/2017 |
| WO | 2021232982 A1 | 11/2021 |

* cited by examiner

*Primary Examiner* — Xuxing Chen
(74) *Attorney, Agent, or Firm* — Conley Rose, P.C.

(57) ABSTRACT

A boot verification method is applied to an electronic device having a secure boot function. An algorithm selection identifier is set in the electronic device to indicate an algorithm used by the electronic device in a boot process, so that on the basis of supporting a plurality of algorithms, the electronic device can select, based on the algorithm selection identifier, a corresponding algorithm to perform boot.

20 Claims, 7 Drawing Sheets

BOOT VERIFICATION METHOD AND RELATED APPARATUS

CROSS-REFERENCE TO RELATED APPLICATIONS

This claims priority to Chinese Patent Application No. 202211234569.5, filed on Oct. 10, 2022, which is incorporated by reference.

FIELD

This disclosure relates to the field of computer security technologies, and in particular, to a boot verification method and a related apparatus.

BACKGROUND

To ensure security of an electronic device in a boot process, a secure boot technology is usually used for boot. In the secure boot technology, cryptography is used to protect integrity of boot code of the electronic device in the boot process. In a secure boot process, secure boot code inside a chip first verifies an image file of a to-be-loaded program based on a cryptographic algorithm, and loads the image file of the program after the verification succeeds. In this way, based on the secure boot technology, integrity and validity of the image file of the program loaded by the electronic device in the boot process can be ensured.

Currently, one cryptographic algorithm is usually used in the electronic device for secure boot. However, as cryptographic algorithms rapidly develop, a new cryptographic algorithm with higher security will be launched in the future, for example, a post-quantum cryptographic algorithm.

Therefore, based on the existing secure boot manner, the electronic device can perform secure boot by using one cryptographic algorithm, and cannot perform secure boot by using another cryptographic algorithm. As a result, it is difficult for the electronic device to meet a higher security requirement.

SUMMARY

This disclosure provides a boot verification method. An algorithm selection identifier is set in an electronic device to indicate an algorithm used by the electronic device in a boot process, so that on the basis of supporting a plurality of algorithms, the electronic device can select, based on the algorithm selection identifier, a corresponding algorithm to perform boot, thereby improving flexibility of the electronic device in the boot process, and ensuring that the electronic device can meet a security evolution requirement of a cryptographic algorithm.

A first aspect provides a boot verification method. The method is applied to an electronic device having a secure boot function, for example, applied to a system on chip (SoC) in the electronic device. An example in which the boot verification method is applied to the SoC in the electronic device is used. The method includes: After the electronic device is powered on, the SoC obtains an algorithm selection identifier, to determine an algorithm used to verify boot firmware in a boot process. The algorithm selection identifier indicates an algorithm used by the electronic device in a boot phase, and the electronic device supports a plurality of algorithms applied to the boot phase. That the electronic device is powered on means that the electronic device switches from a state in which the electronic device is not connected to a power supply to a state in which the electronic device is connected to a power supply (that is, the SoC in the electronic device switches from a state in which the SoC has no voltage to a state in which the SoC has a voltage), or that the electronic device is rebooted in a state in which the electronic device is connected to a power supply (that is, the SoC of the electronic device is reset in a state in which the SoC has a voltage).

Then, the SoC verifies, based on the algorithm selection identifier, the boot firmware by using a target algorithm. The target algorithm is an algorithm, corresponding to the algorithm selection identifier, in the plurality of algorithms. In other words, the SoC selects, based on the algorithm selection identifier, the target algorithm from the plurality of algorithms supported by the electronic device, to verify the boot firmware.

In this solution, the algorithm selection identifier is set in the electronic device to indicate the algorithm used by the electronic device in the boot process, so that on the basis of supporting a plurality of algorithms, the electronic device can select, based on the algorithm selection identifier, a corresponding algorithm to perform boot, thereby improving flexibility of the electronic device in the boot process, and ensuring that the electronic device can meet a security evolution requirement of a cryptographic algorithm.

In a possible implementation, the algorithm selection identifier is represented with at least one bit, and a value of the at least one bit indicates the algorithm used by the electronic device in the boot phase. In other words, the at least one bit represents different algorithms with different values. Based on the value of the at least one bit in the preset storage medium, the SoC can uniquely determine an algorithm, that is, the target algorithm.

In this solution, the algorithm selection identifier is represented with the bit, so that selection of a verification algorithm in the boot process can be simply and effectively implemented when modifications to the conventional technology are reduced to the greatest extent, thereby improving implementability of the solution.

In a possible implementation, the at least one bit is located in a preset storage medium, and the preset storage medium is any one or more of the following storage media: an electric fuse (efuse), an electrically erasable programmable read-only memory (EEPROM), or a flash.

In a possible implementation, in a running phase of the electronic device, the SoC receives and verifies an identifier update request. The identifier update request is for requesting to update the algorithm selection identifier in the preset storage medium. When verification on the identifier update request succeeds, the SoC executes the identifier update request, to update the value of the at least one bit.

In this solution, a manner in which the SoC receives the identifier update request to change the algorithm selection identifier is designed, so that the verification algorithm used by the electronic device in the boot process can be effectively switched, thereby improving flexibility of the solution.

In a possible implementation, the at least one bit representing the algorithm selection identifier is located at a preset location in the boot firmware. Some bits in the boot firmware represent the algorithm selection identifier, to indicate an algorithm for verifying the boot firmware.

In a possible implementation, the SoC receives a firmware update request. The firmware update request is for requesting to update the boot firmware. When verification on the firmware update request succeeds, the SoC executes the firmware update request, to update the boot firmware and the algorithm selection identifier in the boot firmware.

In a possible implementation, the SoC obtains a level value of at least one pin in the SoC, and obtains, based on a preset mapping relationship, the algorithm selection identifier corresponding to the level value. The mapping relationship indicates a relationship between the level value of the pin and a value of the algorithm selection identifier. For example, in the preset mapping relationship, each pin corresponds to one bit in the algorithm selection identifier. When the level value of the pin is a low level, a value of the bit that is in the algorithm selection identifier and that corresponds to the pin is 0. When the level value of the pin is a high level, the value of the bit that is in the algorithm selection identifier and that corresponds to the pin is 1. In this way, the SoC can obtain the algorithm selection identifier by reading the level value of the pin, to determine the algorithm for verifying the boot firmware.

In this solution, the corresponding algorithm selection identifier is determined based on the level value of the at least one pin of the SoC, so that another device other than the SoC can determine the verification algorithm in the boot process, thereby improving flexibility of the solution.

In a possible implementation, the electronic device includes the SoC and a programmable logic control unit. The at least one pin in the SoC is connected to the programmable logic control unit, and the programmable logic control unit is configured to control a level value of an output signal that is output to the at least one pin.

In a possible implementation, the electronic device obtains a code update request. The code update request is for requesting to update code run by the programmable logic control unit. When verification on the code update request succeeds, the electronic device executes the code update request, to update the code run by the programmable logic control unit. The programmable logic control unit is configured to run the code to control the level value of the output signal that is output to the at least one pin.

In a possible implementation, the target algorithm includes a post-quantum cryptographic algorithm, a Rivest-Shamir-Adleman (RSA) cryptographic algorithm, an elliptic curve cryptography algorithm, an SM2 cryptographic algorithm, a hash algorithm, or a symmetric block cryptographic algorithm.

A second aspect provides an electronic device. The electronic device includes an obtaining module, configured to: after the electronic device is powered on, obtain an algorithm selection identifier, where the algorithm selection identifier indicates an algorithm used by the electronic device in a boot phase, and the electronic device supports a plurality of algorithms applied to the boot phase; and a processing module, configured to verify boot firmware based on the algorithm selection identifier by using a target algorithm, where the target algorithm is an algorithm, corresponding to the algorithm selection identifier, in the plurality of algorithms.

In a possible implementation, the algorithm selection identifier is represented with at least one bit, and a value of the at least one bit indicates the algorithm used by the electronic device in the boot phase.

In a possible implementation, the at least one bit is located in a preset storage medium, and the preset storage medium is any one or more of the following storage media: an efuse, an EEPROM, or a flash.

In a possible implementation, in a running phase of the electronic device, the obtaining module is further configured to receive an identifier update request, where the identifier update request is for requesting to update the algorithm selection identifier in the preset storage medium; and the processing module is further configured to: when verification on the identifier update request succeeds, execute the identifier update request, to update the value of the at least one bit.

In a possible implementation, the at least one bit is located at a preset location in the boot firmware.

In a possible implementation, the obtaining module is further configured to receive a firmware update request, where the firmware update request is for requesting to update the boot firmware; and the processing module is further configured to: when verification on the firmware update request succeeds, execute the firmware update request, to update the boot firmware and the algorithm selection identifier in the boot firmware.

In a possible implementation, the obtaining module is further configured to: obtain a level value of at least one pin of a SoC in the electronic device, and obtain, based on a preset mapping relationship, the algorithm selection identifier corresponding to the level value, where the mapping relationship indicates a relationship between the level value of the pin and a value of the algorithm selection identifier.

In a possible implementation, the electronic device includes the SoC and a programmable logic control unit; and the at least one pin in the SoC is connected to the programmable logic control unit, and the programmable logic control unit is configured to control a level value of an output signal that is output to the at least one pin.

In a possible implementation, the obtaining module is further configured to obtain a code update request, where the code update request is for requesting to update code run by the programmable logic control unit; and the processing module is further configured to: when verification on the code update request succeeds, execute the code update request, to update the code run by the programmable logic control unit, where the programmable logic control unit is configured to run the code to control the level value of the output signal that is output to the at least one pin.

In a possible implementation, the target algorithm includes a post-quantum cryptographic algorithm, an RSA cryptographic algorithm, an elliptic curve cryptography algorithm, an SM2 cryptographic algorithm, a hash algorithm, or a symmetric block cryptographic algorithm.

A third aspect provides an electronic device, including a processor and a memory. The memory is configured to store program code, and the processor is configured to invoke the program code in the memory, so that a network device performs the method according to any one of the implementations of the first aspect.

A fourth aspect provides a computer-readable storage medium. The computer-readable storage medium stores instructions, and when the instructions are run on a computer, the computer is enabled to perform the method according to any one of the implementations of the first aspect.

A fifth aspect provides a computer program product. When the computer program product is run on a computer, the computer is enabled to perform the method according to any one of the implementations of the first aspect.

A sixth aspect provides a chip, including one or more processors. Some or all of the processors are configured to read and execute computer instructions stored in a memory, to perform the method in any possible implementation of any one of the foregoing aspects. Optionally, the chip further includes the memory. Optionally, the chip further includes a communication interface, and the processor is connected to the communication interface. The communication interface is configured to receive data and/or information that may be processed. The processor obtains the data and/or the information from the communication interface, processes the data and/or the information, and outputs a processing result through the communication interface. Optionally, the communication interface is an input/output interface or a bus interface. The method is implemented by one chip, or is implemented by a plurality of chips in cooperation.

The solutions provided in the second aspect to the sixth aspect are used to implement or cooperate to implement the method provided in the first aspect, and therefore, can achieve beneficial effects the same as or corresponding to those in the first aspect. Details are not described herein again.

DETAILED DESCRIPTION

Figure 1:
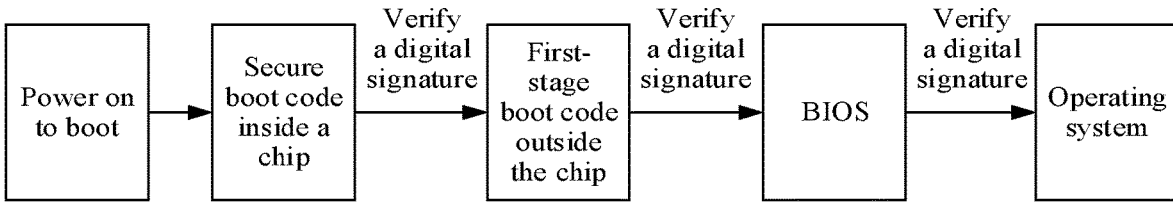
FIG. 1 is a schematic diagram of a secure boot process of an electronic device.

The following describes embodiments of this disclosure with reference to accompanying drawings. It is clear that the described embodiments are merely some but not all of embodiments of this disclosure. A person of ordinary skill in the art may learn that, with development of technologies and emergence of new scenarios, the technical solutions provided in the embodiments are also applicable to similar technical problems.

The terms "first", "second", and the like are intended to distinguish between similar objects but do not necessarily indicate a specific order or sequence.

The specific term "example" herein means "used as an example, embodiment or illustration". Any embodiment described as an "example" herein is not necessarily explained as being superior or better than other embodiments.

The following first explains and describes some terms and concepts.

(1) Post-Quantum Cryptographic Algorithm

The post-quantum cryptographic algorithm is a next-generation cryptographic algorithm that can resist attacks of quantum computers. Due to the emergence of the quantum computer, most conventional cryptographic algorithms (such as an RSA cryptographic algorithm and an elliptic curve cryptography algorithm) can be cracked by a sufficiently large and stable quantum computer. Therefore, cryptographic algorithms that can resist attacks of the quantum computer can survive in the era of quantum computing and in the era after quantum computing, and are referred to as "post-" quantum cryptography.

(2) RSA Cryptographic Algorithm

The RSA cryptographic algorithm is proposed by Ron Rivest, Adi Shamir, and Leonard Adleman. RSA consists of the first letters of surnames of the three people. The principle of the RSA cryptographic algorithm is as follows: According to the number theory, it is quite easy to multiply two large prime numbers, but it is extremely difficult to perform factorization on a product of the two large prime numbers. Therefore, the product may be publicly used as an encryption key and the two large prime numbers may be used as a decryption key.

(3) Elliptic Curve Cryptography (ECC) Algorithm

The elliptic curve cryptography algorithm is a public key encryption technology. In the elliptic curve cryptography algorithm, the discrete logarithm difficulty of points of an elliptic curve in a finite field is used based on the elliptic curve theory, to implement encryption, decryption, and digital signature. Generally, an addition operation in the elliptic curve and a modular multiplication operation in the discrete logarithm are put in a correspondence, so that a corresponding cryptosystem based on the elliptic curve can be established.

(4) SM2 Cryptographic Algorithm

The SM2 cryptographic algorithm is an elliptic curve cryptography algorithm released by the State Cryptography Administration.

(5) Hash Algorithm

The hash algorithm is an encryption algorithm. In the hash algorithm, a hash function is used to map a message M with any length to a value H(M) with a relatively small length and a fixed length, where H(M) is referred to as a hash value. The hash algorithm is a one-way cryptosystem, that is, a non-reversible mapping from plaintext to ciphertext. Only the encryption process is involved, and no decryption process is involved.

(6) Symmetric Block Cryptographic Algorithm

In the symmetric block cryptographic algorithm, a data sender processes both plaintext (raw data) and an encryption key by using a special encryption algorithm to obtain complex encrypted ciphertext, and then sends the ciphertext. After receiving the ciphertext, a data receiver may use the encryption key and an inverse algorithm of the encryption algorithm to decrypt the ciphertext. In this way, the ciphertext can be restored to readable plaintext. In the symmetric block cryptographic algorithm, one key is used. Both the data sender and the data receiver use this key to encrypt and decrypt data. Therefore, a decryption party may know the encryption key in advance.

(7) System on Chip (SoC)

The SoC is chip integration of a core of an information system, and integrates key components of the system on a chip. In short, the SoC is a system or product formed through combination of a plurality of integrated circuits having a specific function on a chip, and includes a complete hardware system and embedded software carried by the hardware system.

(8) Programmable Logic Control Unit

The programmable logic control unit is a device configured to perform a digital operation. The programmable logic control unit uses a programmable memory, stores, inside the memory, instructions for performing operations such as a logical operation, sequence control, timing, counting, and arithmetic operation, and controls various types of components or apparatuses by using digital or analog input and output. For example, the programmable logic control unit is, for example, a complex programmable logic device (CPLD), a field-programmable gate array (FPGA), or an erasable programmable logic device (EPLD).

Refer to FIG. 1. FIG. 1 is a schematic diagram of a secure boot process of an electronic device. As shown in FIG. 1, after the electronic device is powered on and booted, secure boot code inside a chip in the electronic device is first run. The secure boot code is usually stored in a storage medium inside the chip, for example, a read-only memory (ROM) inside the chip. Generally, the secure boot code is a trusted root of the chip, that is, a start point of trust.

The secure boot code reads and verifies a digital signature of first-stage boot code outside the chip during running. When verification on the digital signature of the first-stage boot code outside the chip succeeds, the first-stage boot code outside the chip is executed.

The first-stage boot code outside the chip reads and verifies a digital signature of a basic input output system (BIOS) during running. When verification on the digital signature of the BIOS succeeds, the BIOS is executed.

The BIOS reads and verifies a digital signature of an operating system during running. When verification on the digital signature of the operating system succeeds, the operating system is executed.

In general, in the secure boot process of the electronic device, upper-stage code usually uses a cryptographic algorithm to verify a digital signature of next-stage code, so as to form a trusted chain.

Currently, one cryptographic algorithm is usually used in a network device to perform secure boot. In the secure boot process shown in FIG. 1, when verifying boot firmware such as the secure boot code, the first-stage boot code outside the chip, and the BIOS, the electronic device uses one fixed cryptographic algorithm to verify the boot firmware. However, as cryptographic algorithms rapidly develop, a new cryptographic algorithm with higher security will be launched in the future, for example, a post-quantum cryptographic algorithm.

Therefore, based on the existing secure boot manner, the electronic device can perform secure boot by using one cryptographic algorithm, and cannot perform secure boot by using another cryptographic algorithm. As a result, it is difficult for the electronic device to meet a higher security requirement.

In view of this, a boot verification method is provided. An algorithm selection identifier is set in an electronic device to indicate an algorithm used by the electronic device in a secure boot process, so that on the basis of supporting a plurality of algorithms, the electronic device can select, based on an algorithm selection identifier, a corresponding algorithm to perform secure boot, thereby improving flexibility of the electronic device in the secure boot process, and ensuring that the electronic device can meet a security evolution requirement of the cryptographic algorithm.

The method may be applied to an electronic device having a secure boot function. For example, the electronic device may be a server, a personal computer (PC), a smartphone, a notebook computer, a tablet computer, a smart television, a splicing screen, a wearable device (such as a smartwatch, smart glasses, or a smart helmet), a virtual reality (VR) device, an augmented reality (AR) device, a switch, a router, a gateway, a firewall, a hub, a wireless electronic device in industrial control, a wireless electronic device in self driving, or a wireless electronic device in a smart home. A form of the electronic device is not limited in the following embodiments.

Figure 2:
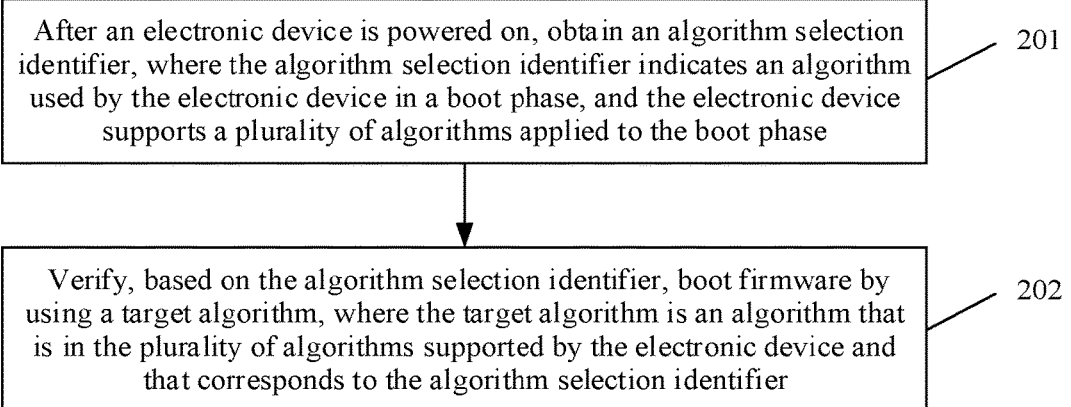
FIG. 2 is a schematic flowchart of a boot verification method.

Refer to FIG. 2. FIG. 2 is a schematic flowchart of a boot verification method. In FIG. 2, the boot verification method is applied to an electronic device, for example, applied to a SoC in the electronic device. For ease of description, the following describes in detail the boot verification method by using the SoC in the electronic device as an execution body. As shown in FIG. 2, the boot verification method includes the following steps 201 and 202.

Step 201: After the electronic device is powered on, obtain an algorithm selection identifier, where the algorithm selection identifier indicates an algorithm used by the electronic device in a boot phase, and the electronic device supports a plurality of algorithms applied to the boot phase.

In a process in which the electronic device is powered on and booted, the SoC in the electronic device first obtains the algorithm selection identifier, to determine an algorithm used to verify boot firmware in the boot process. The plurality of algorithms supported by the electronic device in the boot phase include, for example, a post-quantum cryptographic algorithm, an RSA cryptographic algorithm, an elliptic curve cryptography algorithm, an SM2 cryptographic algorithm, a hash algorithm, or a symmetric block cryptographic algorithm. The algorithm selection identifier indicates an algorithm used by the electronic device in the boot phase. For example, when the electronic device supports the post-quantum cryptographic algorithm, the RSA cryptographic algorithm, and the elliptic curve cryptography algorithm, the algorithm selection identifier indicates that the algorithm used by the electronic device in the boot phase is the post-quantum cryptographic algorithm.

In this embodiment, that the electronic device is powered on may mean that the electronic device switches from a state in which the electronic device is not connected to a power supply to a state in which the electronic device is connected to a power supply, that is, the SoC in the electronic device switches from a state in which the SoC has no voltage to a state in which the SoC has a voltage. That the electronic device is powered on may alternatively mean that the electronic device is rebooted in a state in which the electronic device is connected to a power supply, that is, the SoC of the electronic device is reset in a state in which the SoC has a voltage.

Step 202: Verify, based on the algorithm selection identifier, the boot firmware by using a target algorithm, where the target algorithm is an algorithm, corresponding to the algorithm selection identifier, in the plurality of algorithms supported by the electronic device.

After obtaining the algorithm selection identifier, the SoC can determine, from the plurality of algorithms supported by the electronic device, the target algorithm corresponding to the algorithm selection identifier, and verify the boot firmware based on the target algorithm, to determine whether the boot firmware is trusted.

In short, in the boot process of the electronic device, the SoC in the electronic device first obtains the algorithm selection identifier, to determine the algorithm used in the boot process, and then verifies the boot firmware by using the algorithm indicated by the algorithm selection identifier, to complete the boot process.

In this solution, the algorithm selection identifier is set in the electronic device to indicate the algorithm used by the electronic device in the boot process, so that on the basis of supporting the plurality of algorithms, the electronic device can select, based on the algorithm selection identifier, the corresponding algorithm to perform boot, thereby improving flexibility of the electronic device in the boot process, and ensuring that the electronic device can meet a security evolution requirement of a cryptographic algorithm.

Optionally, in this embodiment, the SoC runs the trusted boot firmware to perform steps 201 and 202. In other words, the SoC runs the trusted boot firmware to obtain the target algorithm used to verify to-be-verified boot firmware, and further verifies the to-be-verified boot firmware based on the target algorithm.

The trusted boot firmware is the first boot firmware that is run by the electronic device in the boot process, for example, the secure boot code that is used as the trust start point in the boot process in FIG. 1. Therefore, the SoC runs the secure boot code to select the target algorithm, and verifies first-stage boot code outside the SoC.

Alternatively, the trusted boot firmware is boot firmware that has been verified in the boot process, for example, the first-stage boot code outside the chip in FIG. 1. After the SoC runs the secure boot code inside the chip to verify the first-stage boot code outside the chip and the verification succeeds, the first-stage boot code outside the chip is the trusted boot firmware. Therefore, the SoC further runs the first-stage boot code outside the chip, to obtain the target algorithm used to verify the BIOS, and verifies the BIOS based on the target algorithm.

It should be noted that the secure boot process shown in FIG. 1 is merely a possible example. In actual application, in addition to the secure boot code inside the chip, the first-stage boot code outside the chip, and the BIOS that are shown in FIG. 1, the to-be-booted boot firmware in the secure boot process may further include other boot firmware. Details are not described herein again. For ease of description, in this embodiment, an example in which the to-be-booted boot firmware in the secure boot process is the boot firmware shown in FIG. 1 is used to describe the boot verification method.

Optionally, in step 201, the SoC obtains the algorithm selection identifier in a plurality of manners. For ease of understanding, the following describes in detail various implementations of obtaining the algorithm selection identifier by the SoC with reference to specific examples.

Implementation 1: The algorithm selection identifier is represented with at least one bit, and the at least one bit is located in a preset storage medium of the electronic device.

A value of the at least one bit indicates the algorithm used by the electronic device in the boot phase. In other words, the at least one bit represents different algorithms with different values. Based on the value of the at least one bit in the preset storage medium, the SoC can uniquely determine an algorithm, that is, the target algorithm. For example, it is assumed that the algorithm selection identifier is represented with two bits. When a value of the two bits is 00, it indicates that the algorithm used by the electronic device in the boot phase is the post-quantum cryptographic algorithm. When the value of the two bits is 01, it indicates that the algorithm used by the electronic device in the boot phase is the RSA cryptographic algorithm. When the value of the two bits is 10, it indicates that the algorithm used by the electronic device in the boot phase is the elliptic curve cryptography algorithm. When the value of the two bits is 11, it indicates that the algorithm used by the electronic device in the boot phase is the SM2 cryptographic algorithm.

In general, when the algorithm selection identifier is represented with the at least one bit, a representation range of the at least one bit determines a quantity of algorithms that can be indicated by the algorithm selection identifier. When the electronic device supports a relatively large quantity of algorithms, a relatively large quantity of bits may be set to represent the algorithm selection identifier. When the electronic device supports a relatively small quantity of algorithms, a relatively small quantity of bits may be set to represent the algorithm selection identifier. For example, when the electronic device supports seven algorithms, three or more bits are set to represent the algorithm selection identifier. A representation range of the three bits is 0 to 7. Therefore, the three bits can represent, with different values, any one of the seven algorithms supported by the electronic device.

Optionally, the preset storage medium configured to store the at least one bit is any one or more of the following storage media: an electric fuse (efuse), an electrically erasable programmable read-only memory (EEPROM), or a flash. The efuse is a one-time programmable memory. The EEPROM is a storage chip in which data is not lost after a power failure. The flash is a non-volatile memory that can hold data for a long time without current supply. In addition, the preset storage medium may alternatively be another storage medium that can implement persistent data storage. Details are not described herein again.

In conclusion, the preset storage medium configured to store the at least one bit is a storage medium that can still store data persistently after a power failure, so as to ensure that the electronic device can select the target algorithm based on the value of the at least one bit in the preset storage medium each time the electronic device is powered on.

Optionally, the foregoing preset storage medium is located in the SoC. For example, the preset storage medium is the efuse in the SoC. The at least one bit representing the algorithm selection identifier is stored in the preset storage medium in the SoC. In this way, storage security of the algorithm selection identifier can be improved, and the algorithm selection identifier is prevented from being easily tampered with. In addition, when a capacity of the storage medium in the SoC is relatively low, the foregoing preset storage medium may also be located outside the SoC. For example, the preset storage medium is a flash outside the SoC. A location of the preset storage medium is not limited in this embodiment.

In Implementation 1, to facilitate switching of a verification algorithm used by the electronic device in the boot process, this embodiment further provides a manner of changing the algorithm selection identifier.

Optionally, in a running phase of the electronic device, the SoC receives an identifier update request, where the identifier update request is for requesting to update the algorithm selection identifier in the preset storage medium. When verification on the identifier update request succeeds, the SoC executes the identifier update request, to update the value of the at least one bit in the preset storage medium, so as to update the algorithm selection identifier. The identifier update request received by the SoC may be sent by a management device outside the electronic device, for example, a management platform established with a server or a compute cluster. A manager enters an identifier update instruction on the management platform, to trigger the management platform to send the identifier update request to the electronic device, so as to change the algorithm selection identifier in the electronic device.

Figure 3:
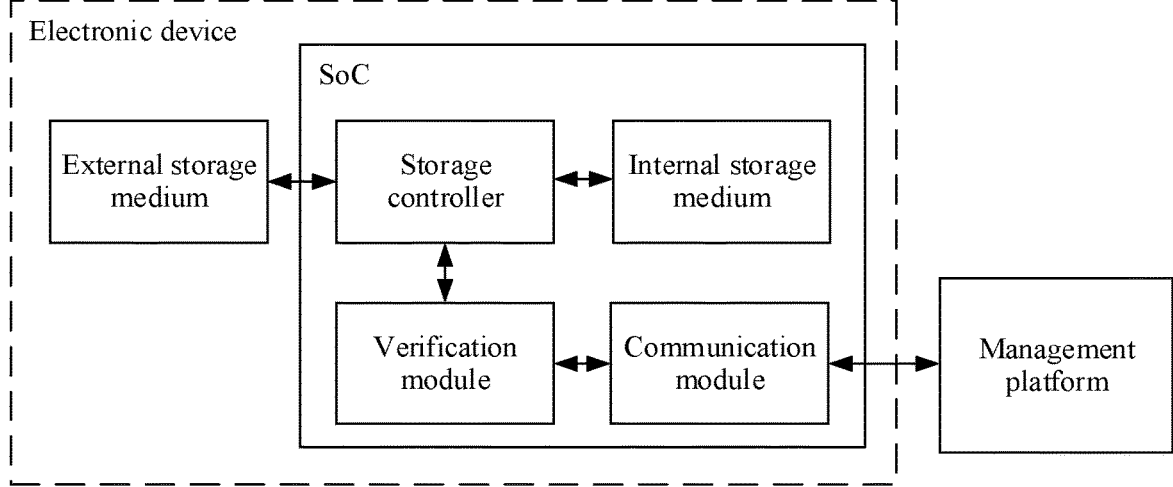
FIG. 3 is a schematic diagram of a structure of an electronic device.

For example, refer to FIG. 3. FIG. 3 is a schematic diagram of a structure of an electronic device. As shown in FIG. 3, the electronic device includes the SoC and an external storage medium located outside the SoC. The SoC includes a communication module, a verification module, a storage controller, and an internal storage medium.

The communication module in the SoC is connected to the management platform, and is configured to receive data sent by the management platform, for example, an identifier update request or identifier update information. In addition, the communication module is further connected to the verification module in the SoC, and is configured to send data from the management platform to the verification module.

The verification module is configured to: perform validity verification on the data forwarded by the communication module, and return a verification result to the communication module in the SoC, so that the communication module can determine whether to continue interaction with the management platform. In addition, the verification module is further connected to the storage controller. If validity verification on the data forwarded by the communication module succeeds, the verification module initiates an operation request to the storage controller, to request the storage controller to update the algorithm selection identifier in the internal storage medium or the external storage medium.

The storage controller is configured to receive the operation request sent by the verification module, to perform operations such as erasure, reading, and writing on a bit in the internal storage medium or the external storage medium.

The internal storage medium in the SoC or the external storage medium outside the SoC is the foregoing preset storage medium, and is configured to store the at least one bit indicating the algorithm selection identifier.

Figure 4:
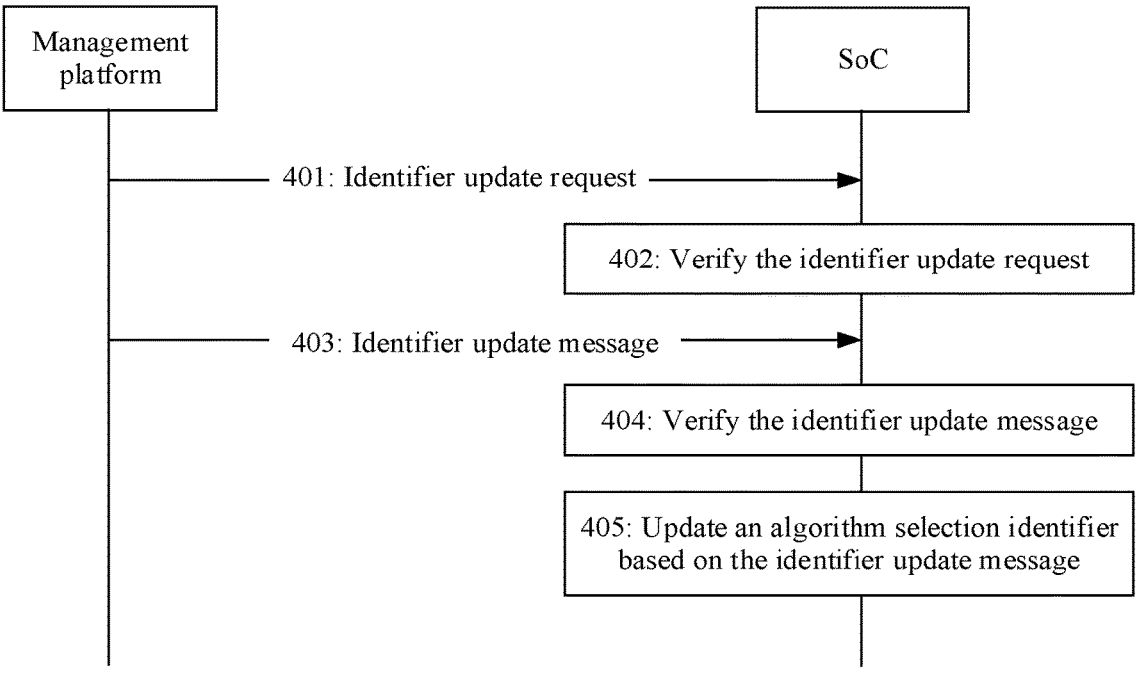
FIG. 4 is a schematic flowchart of updating an algorithm selection identifier in a preset storage medium.

Refer to FIG. 4. FIG. 4 is a schematic flowchart of updating an algorithm selection identifier in a preset storage medium. As shown in FIG. 4, based on the structure shown in FIG. 3, the algorithm selection identifier in the preset storage medium can be updated. A procedure of updating the algorithm selection identifier in the preset storage medium includes the following steps 401 to 405.

Step 401: The management platform sends the identifier update request to the SoC in the electronic device.

When the manager delivers an instruction to the management platform to instruct the management platform to trigger update of the algorithm selection identifier in the electronic device, the management platform sends the identifier update request to the SoC in the electronic device. The identifier update request is, for example, used to request the SoC to update the algorithm selection identifier in the electronic device.

Step 402: The SoC verifies the identifier update request.

To prevent an attacker from maliciously modifying the algorithm selection identifier in the electronic device, the SoC verifies validity of the identifier update request after receiving the identifier update request.

Optionally, the SoC verifies an identity of the management platform to verify the identifier update request. If verification on the identity of the management platform succeeds, it indicates that verification on the identifier update request succeeds. If verification on the identity of the management platform cannot succeed, it indicates that verification on the identifier update request cannot succeed.

For example, the SoC and the management platform may perform bidirectional identity authentication based on the transport layer security (TLS) protocol. For a process in which the SoC and the management platform perform identity authentication based on the TLS protocol, refer to an existing TLS standard. Details are not described herein again. After verification on the management platform succeeds, a secure communication channel is established between the SoC and the management platform, to facilitate subsequent interaction between the SoC and the management platform.

Step 403: After verification on the identifier update request succeeds, the management platform sends an identifier update message to the SoC.

The identifier update message indicates, for example, how to update the algorithm selection identifier in the electronic device. For example, the identifier update message includes a plurality of fields, and the plurality of fields indicate how to update the algorithm selection identifier. In a possible example, the plurality of fields included in the identifier update message are shown in the following Table 1.

TABLE 1

| Field sequence number | Field name | Value (hexa-decimal) | Field meaning |
|---|---|---|---|
| 1 | Write instruction | 0x01 | A current operation is to write data into the efuse in the SoC. |
| 2 | Write into the address | 0x100 | Write data into the 0x100 address in the efuse. |
| 3 | Write data | 0x03 | Write three-bit data into the 0x100 address in the efuse, and a written value is 011. |
| 4 | Digital signature | 512-byte data | Use a private key of the RSA cryptographic algorithm to perform digital signature on fields 1, 2, and 3, so as to obtain the 512-byte data. |

Step 404: The SoC verifies the identifier update message.

In a process in which the SoC verifies the identifier update message, the SoC performs secure communication with the management platform by using the TLS protocol, obtains a public key of the RSA cryptographic algorithm from the management platform, and verifies the digital signature in the identifier update message by using the public key, to verify the identifier update message.

Step 405: The SoC updates the algorithm selection identifier based on the identifier update message.

After verification on the identifier update message succeeds, the SoC updates the algorithm selection identifier based on an indication of the identifier update message. For example, the SoC modifies a value of the algorithm selection identifier from "000" to "011", indicating that the post-quantum cryptographic algorithm used by the electronic device in the boot process is switched to the SM2 algorithm.

It should be noted that, in the embodiment shown in FIG. 4, the management platform sends the identifier update request to request to update the algorithm selection identifier, and after the verification succeeds, sends the identifier update message to indicate how to update the algorithm selection identifier. In some other embodiments, the management platform may send the identifier update request to not only request to update the algorithm selection identifier, but also indicate how to update the algorithm selection identifier. In other words, after verification on the identifier update request succeeds, the SoC can update the algorithm selection identifier based on the identifier update request. The management platform does not need to send the identifier update message.

Implementation 2: The algorithm selection identifier is represented with at least one bit, and the at least one bit is located at a preset location in the boot firmware.

Same as Implementation 1, in Implementation 2, the algorithm selection identifier is also represented with the at least one bit. A difference is that in Implementation 2, the at least one bit representing the algorithm selection identifier is located at the preset location in the boot firmware. Some bits in the boot firmware represent the algorithm selection identifier, to indicate the algorithm for verifying the boot firmware.

For example, in the boot firmware, 32 bits are used to represent the algorithm selection identifier at an address that is offset by 0x3000 relative to a start address 0x00000. When a value of the 32 bits is 0x00000000, it indicates that the RSA cryptographic algorithm is used. When the value of the 32 bits is 0x00000001, it indicates that the post-quantum cryptographic algorithm is used.

For example, an example of a data format of the boot firmware is shown in Table 2.

signature value of the digital signature performed on the first data segment to the fourth data segment with the post-quantum algorithm.

Figure 5:
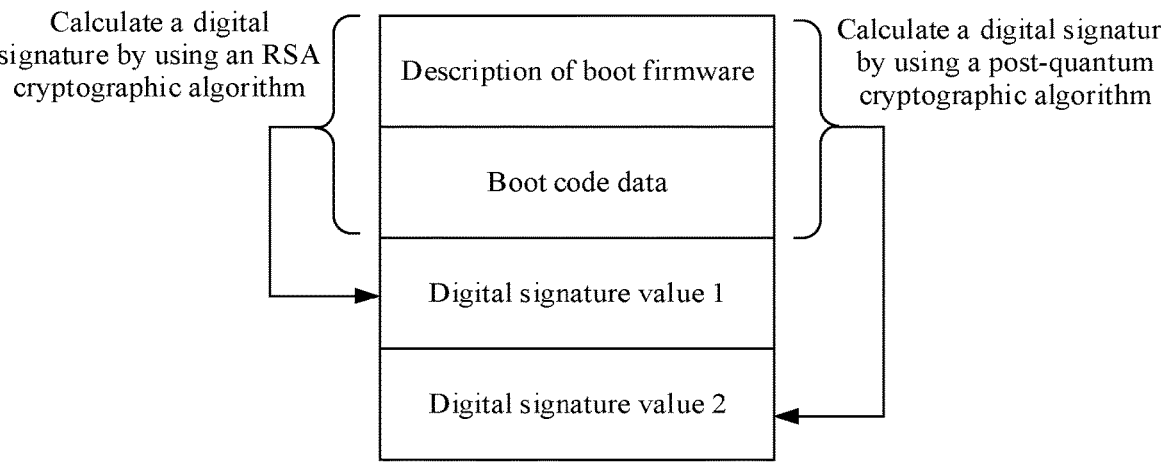
FIG. 5 is a schematic diagram of a data format of boot firmware.

For example, refer to FIG. 5. FIG. 5 is a schematic diagram of a data format of boot firmware. As shown in FIG. 5, the data format of the boot firmware may be divided into four parts. The first part is a description of the boot firmware. The second part is the data of the boot code. The third part is a digital signature value 1, and the digital signature value 1 is obtained through digital signature calculation on content of the first part and the second part with the RSA cryptographic algorithm. In other words, the digital signature value 1 is a digital signature value of the RSA cryptographic algorithm. The fourth part is a digital signature value 2, and the digital signature value 2 is obtained through digital signature calculation on the content of the first part and the second part with the post-quantum cryptographic algorithm. In other words, the digital signature value 2 is a digital signature value of the post-quantum cryptographic algorithm.

For the boot firmware shown in FIG. 5, when the algorithm selection identifier in the boot firmware indicates to use the RSA algorithm to verify the boot firmware, the SoC

TABLE 2

| Data segment sequence number | Data segment name | Offset address | Content of stored data |
|---|---|---|---|
| 1 | Description of boot firmware | 0x00000 to 0x2FFF | Start address of the boot firmware, length of the boot firmware, public key information for verifying a digital signature value, and signature algorithm parameter information |
| 2 | Description of boot firmware | 0x03000 to 0x03003 | Algorithm selection identifier; 0x00000000: indicating that the RSA cryptographic algorithm is used. 0x00000001: indicating that the post-quantum cryptographic algorithm is used. |
| 3 | Description of boot firmware | 0x03004 to 0x03fff | Reserved area, filled with 0xff |
| 4 | Boot code | 0x04000 to 0x0ffff | Boot code data of the SoC |
| 5 | Digital signature value of the RSA | 0x10000 to 0x101ff | Signature value of digital signature performed on data segments 1, 2, 3, and 4 by a signature center with an RSA private key |
| 6 | Digital signature value of the post-quantum cryptographic algorithm | 0x10200 to 0x121ff | Signature value of digital signature performed on the data segments 1, 2, 3, and 4 by the signature center with a private key of the post-quantum cryptographic algorithm |

It can be learned from Table 2 that data in the boot firmware may be divided into six data segments. The first data segment to the third data segment are used to record descriptions of the boot firmware, that is, indicate information of the boot firmware. The second data segment represents the algorithm selection identifier, that is, indicates an algorithm that may be used to verify the current boot firmware. The fourth data segment is used to record boot code in the boot firmware, that is, data of the boot code that is run by the SoC. The fifth data segment is used to record the signature value of the digital signature performed on the first data segment to the fourth data segment with the RSA algorithm. The sixth data segment is used to record the verifies the digital signature value 1 in the boot firmware by using the RSA cryptographic algorithm. When the algorithm selection identifier in the boot firmware indicates to use the post-quantum cryptographic algorithm to verify the boot firmware, the SoC verifies the digital signature value 2 in the boot firmware by using the post-quantum cryptographic algorithm.

Figure 6:
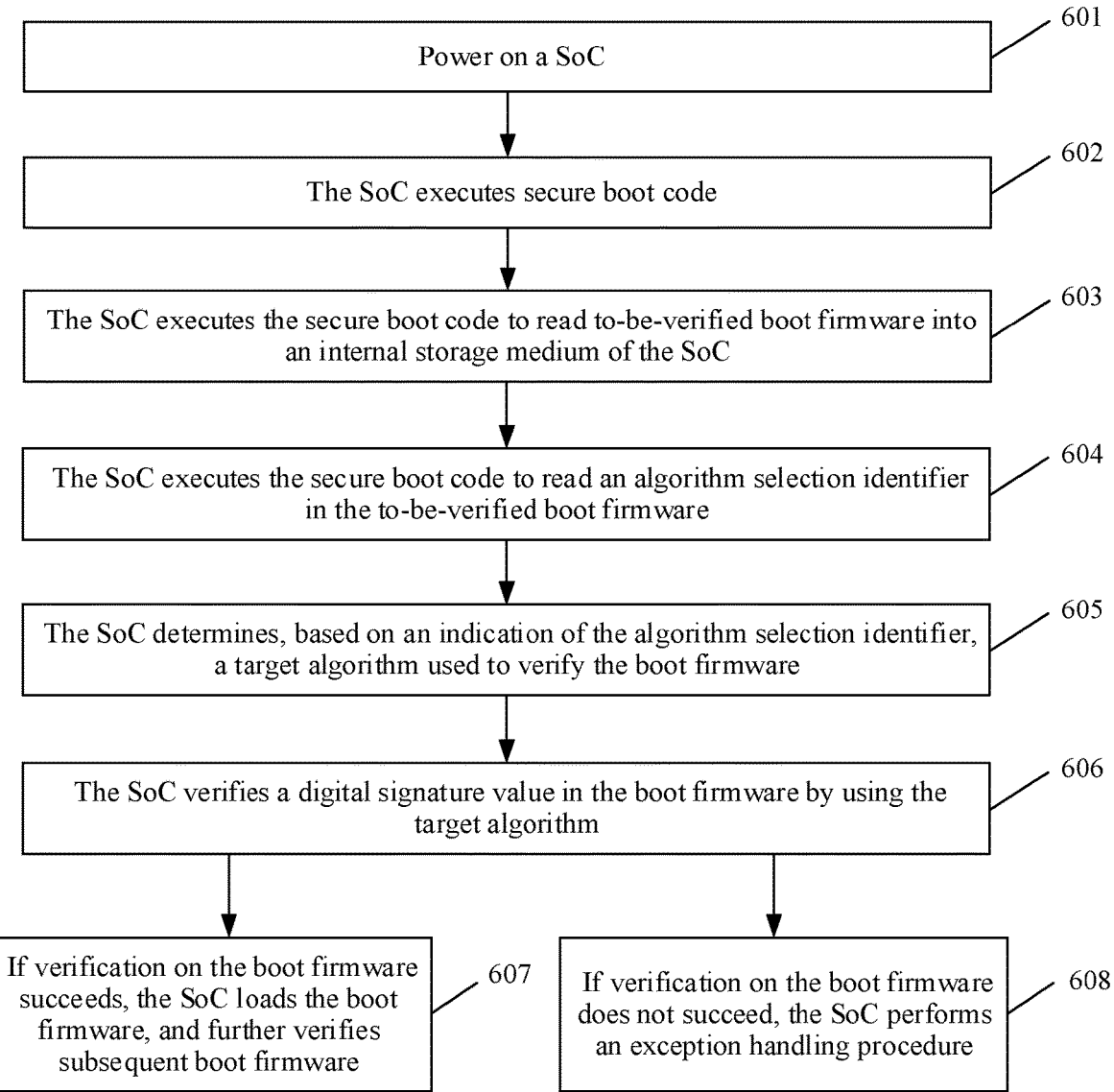
FIG. 6 is a schematic flowchart of reading, by a SoC, an algorithm selection identifier in boot firmware to verify the boot firmware.

For example, refer to FIG. 6. FIG. 6 is a schematic flowchart of reading, by a SoC, an algorithm selection identifier in boot firmware to verify the boot firmware. As shown in FIG. 6, a process in which the SoC verifies the boot firmware includes the following steps 601 to 608.

Step 601: Power on the SoC.

In this embodiment, after the electronic device is powered on, the SoC is also powered on simultaneously, and starts to perform a verification process of the boot firmware.

Step 602: The SoC executes the secure boot code.

After the SoC is powered on, the SoC runs the secure boot code stored inside the SoC, to verify subsequent boot firmware.

Optionally, in step 603, the SoC executes the secure boot code to read to-be-verified boot firmware into the internal storage medium of the SoC.

Step 604: The SoC executes the secure boot code to read the algorithm selection identifier in the to-be-verified boot firmware.

For example, the SoC reads an address that is in the to-be-verified boot firmware and that is offset by 0x3000 to 0x03003 relative to the start address 0x00000, so as to obtain the algorithm selection identifier in the to-be-verified boot firmware through reading.

Step 605: The SoC determines, based on an indication of the algorithm selection identifier, the target algorithm used to verify the boot firmware.

For example, when the value of the algorithm selection identifier is 0x00000000, the SoC determines that the target algorithm used to verify the boot firmware is the RSA cryptographic algorithm. When the value of the algorithm selection identifier is 0x00000001, the SoC determines that the target algorithm used to verify the boot firmware is the post-quantum cryptographic algorithm.

Step 606: The SoC verifies a digital signature value in the boot firmware by using the target algorithm.

For example, when the target algorithm is the RSA cryptographic algorithm, the SoC verifies the digital signature value 1 in the boot firmware by using the RSA cryptographic algorithm. When the target algorithm is the post-quantum cryptographic algorithm, the SoC verifies the digital signature value 2 in the boot firmware by using the post-quantum cryptographic algorithm.

Step 607: If verification on the boot firmware succeeds, the SoC loads the boot firmware, and further verifies subsequent boot firmware.

Step 608: If verification on the boot firmware does not succeed, the SoC performs an exception handling procedure.

For example, the SoC interrupts the boot process, and reports a boot exception event to the management platform.

It should be noted that, in Implementation 2, the algorithm selection identifier is actually located in the to-be-verified boot firmware. Therefore, when running upper-stage boot firmware of the to-be-verified boot firmware to verify the to-be-verified boot firmware, the SoC select a corresponding verification algorithm based on the algorithm selection identifier in the to-be-verified boot firmware.

Generally, there are a plurality of pieces of to-be-verified boot firmware in the boot process of the electronic device. In some embodiments, for a same electronic device, each of the plurality of pieces of to-be-verified boot firmware in the boot process of the electronic device may include an algorithm selection identifier. In other words, each piece of to-be-verified boot firmware indicates, by using the algorithm selection identifier in the boot firmware, an algorithm for verifying the current boot firmware. Optionally, for each piece of to-be-verified boot firmware, algorithm selection identifiers in different boot firmware indicate that a same algorithm is used. For example, an algorithm selection identifier in the first-stage boot code outside the chip shown in FIG. 1 indicates that the post-quantum cryptographic algorithm is used, and an algorithm selection identifier in the BIOS shown in FIG. 1 also indicates that the post-quantum cryptographic algorithm is used. Alternatively, the algorithm selection identifiers in different boot firmware indicate that different algorithms are used. For example, the algorithm selection identifier in the first-stage boot code outside the chip shown in FIG. 1 indicates that the post-quantum cryptographic algorithm is used, and the algorithm selection identifier in the BIOS shown in FIG. 1 indicates that the RSA cryptographic algorithm is used.

In some other embodiments, for a plurality of pieces of to-be-verified boot firmware in the boot process of the electronic device, some of the boot firmware includes the algorithm selection identifier. For the boot firmware that does not include the algorithm selection identifier, the SoC may determine, in another implementation other than Implementation 2, algorithms for verifying the boot firmware.

In Implementation 2, to facilitate switching of the verification algorithm used by the electronic device in the boot process, this embodiment also provides a manner of changing the algorithm selection identifier.

Optionally, in the running phase of the electronic device, the SoC in the electronic device receives a firmware update request sent by the management platform. The firmware update request is for requesting to update the boot firmware. When verification on the firmware update request succeeds, the SoC executes the firmware update request to update the boot firmware and the algorithm selection identifier in the boot firmware. It should be understood that, because the algorithm selection identifier is located in the boot firmware, the SoC can update the algorithm selection identifier by updating the boot firmware, so as to switch the algorithm for verifying the boot firmware in the boot process.

Figure 7:
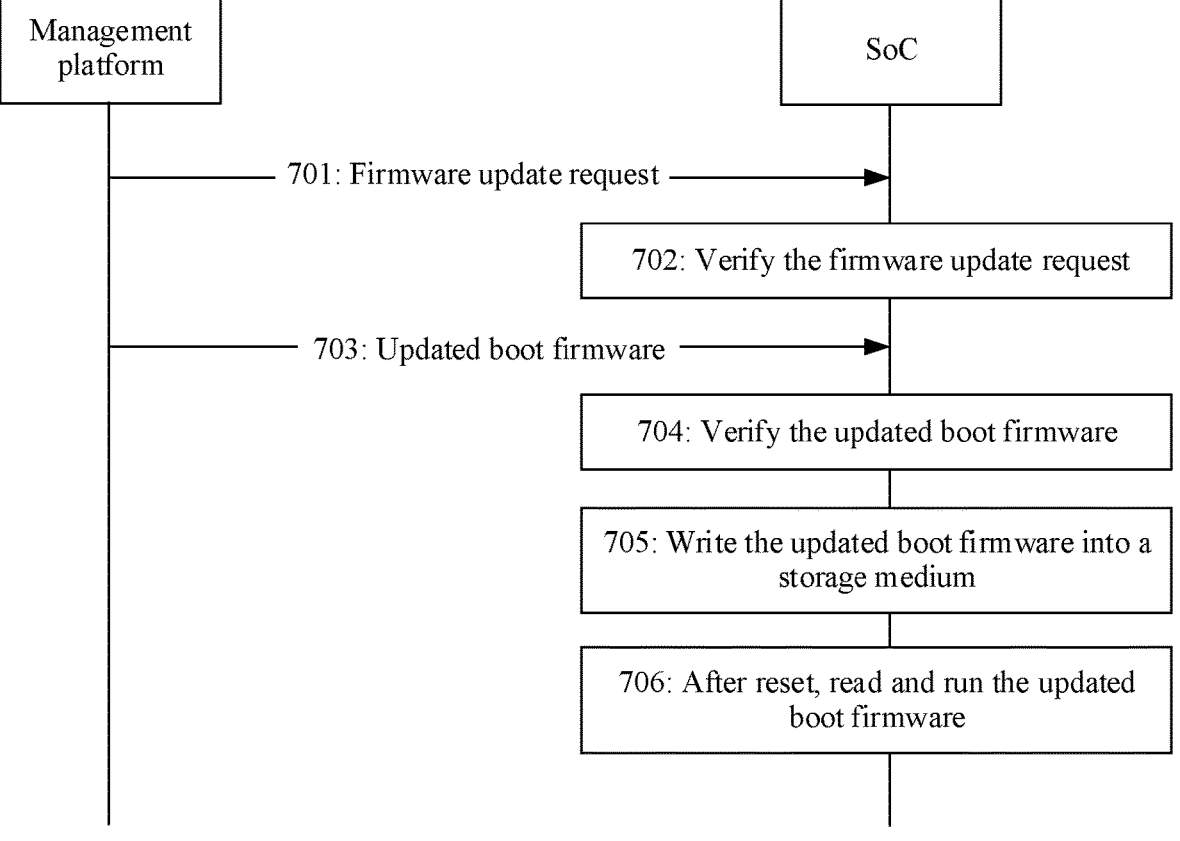
FIG. 7 is a schematic flowchart of updating, by a SoC, boot firmware to update an algorithm selection identifier.

For example, refer to FIG. 7. FIG. 7 is a schematic flowchart of updating, by a SoC, boot firmware to update an algorithm selection identifier. As shown in FIG. 7, a process in which the SoC updates the algorithm selection identifier in the boot firmware includes the following steps 701 to 706.

Step 701: The management platform sends the firmware update request to the SoC in the electronic device.

When the manager delivers an instruction to the management platform to instruct the management platform to trigger update of the boot firmware in the electronic device, the management platform sends the firmware update request to the SoC in the electronic device. The firmware update request is, for example, used to request the SoC to update a piece of boot firmware in the electronic device.

Step 702: The SoC verifies the firmware update request.

To prevent an attacker from maliciously modifying the boot firmware in the electronic device, the SoC verifies validity of the firmware update request after receiving the firmware update request.

Optionally, the SoC verifies the identity of the management platform to verify the firmware update request. When verification on the identity of the management platform succeeds, it indicates that verification on the firmware update request succeeds. When verification on the identity of the management platform cannot succeed, it indicates that verification on the firmware update request cannot succeed.

Step 703: After verification on the firmware update request succeeds, the management platform sends updated boot firmware to the SoC.

A new algorithm selection identifier is used in the updated boot firmware. In other words, the algorithm selection identifier in the boot firmware is updated. In addition, another part of the updated boot firmware may also be updated. This is not limited in this embodiment.

Step 704: The SoC verifies the updated boot firmware.

In a process in which the SoC verifies the updated boot firmware, the SoC performs secure communication with the management platform by using the TLS protocol, obtains the public key of the RSA cryptographic algorithm from the management platform, and verifies a digital signature in the updated boot firmware by using the public key, to verify the updated boot firmware.

Step 705: After verification on the updated boot firmware succeeds, the SoC writes the updated boot firmware into a storage medium.

The SoC may write the updated boot firmware into the storage medium that is used to store the boot firmware that is not updated, so as to overwrite the boot firmware that is not updated with the updated boot firmware.

Step 706: After being reset, the SoC reads and runs the updated boot firmware, to switch a boot verification algorithm.

Implementation 3: The algorithm selection identifier is obtained in a manner of obtaining a level value of at least one pin of the SoC.

In Implementation 3, the SoC first obtains the level value of the at least one pin in the SoC, and obtains, based on a preset mapping relationship, an algorithm selection identifier corresponding to the level value of the at least one pin. The preset mapping relationship indicates a relationship between the level value of the pin and a value of the algorithm selection identifier. For example, in the preset mapping relationship, each pin corresponds to one bit in the algorithm selection identifier. When the level value of the pin is a low level, a value of the bit that is in the algorithm selection identifier and that corresponds to the pin is 0. When the level value of the pin is a high level, the value of the bit that is in the algorithm selection identifier and that corresponds to the pin is 1.

In this way, the SoC can obtain the algorithm selection identifier by reading the level value of the pin, to determine an algorithm for verifying the boot firmware.

A quantity of the at least one pin that is in the SoC and that is used to obtain the algorithm selection identifier may be determined based on a quantity of algorithms supported by the electronic device. A larger quantity of algorithms supported by the electronic device indicates a larger quantity of the at least one pin that is in the SoC and that is used to obtain the algorithm selection identifier. A smaller quantity of algorithms supported by the electronic device indicates a smaller quantity of the at least one pin that is in the SoC and that is used to obtain the algorithm selection identifier. For ease of understanding, the following uses an example in which the SoC uses three pins (a pin 1, a pin 2, and a pin 3) to obtain the algorithm selection identifiers for description. When the SoC uses the three pins to obtain the algorithm selection identifier, a mapping relationship used to obtain the algorithm selection identifier corresponding to level values of the three pins is shown in Table 3.

TABLE 3

| Level values of pin 1, pin 2, and pin 3 | Algorithm selection identifier | Algorithm to be selected |
|---|---|---|
| Low, low, low | 000 | Post-quantum cryptographic algorithm |
| Low, low, high | 001 | RSA cryptographic algorithm |
| Low, high, low | 010 | ECC cryptographic algorithm |
| Low, high, high | 011 | SM2 cryptographic algorithm |
| High, low, low | 100 | Hash algorithm |
| High, low, high | 101 | Symmetric block cryptographic algorithm |
| High, high, low | 110 | . . . |
| High, high, high | 111 | . . . |

It can be learned from Table 3 that, when the SoC uses the three pins to obtain the algorithm selection identifier, the SoC can indicate at most eight different algorithms by using the three pins, for example, the post-quantum cryptographic algorithm, the RSA cryptographic algorithm, the elliptic curve cryptography algorithm, the SM2 cryptographic algorithm, the hash algorithm, or the symmetric block cryptographic algorithm described in Table 3.

Optionally, the electronic device includes the SoC and a programmable logic control unit. If the at least one pin in the SoC is connected to the programmable logic control unit, the programmable logic control unit is configured to control a level value of an output signal that is output to the at least one pin. In other words, the level value of the at least one pin that is in the SoC and that indicates the algorithm selection identifier is controlled by the programmable logic control unit. For example, the programmable logic control unit may control, by using a value of an internal register, the level value of the output signal that is output to the at least one pin of the SoC. The programmable logic control unit includes but is not limited to: a CPLD, an FPGA, and an EPLD. A form of the programmable logic control unit is not limited in this embodiment.

Figure 8:
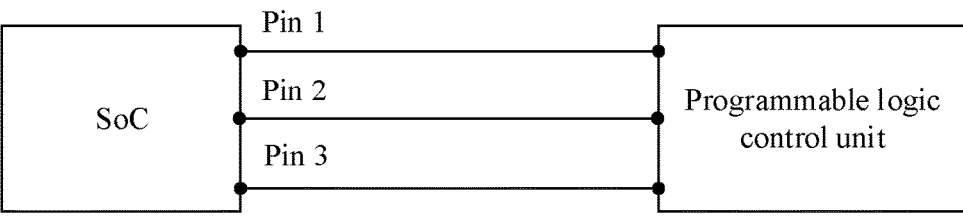
FIG. 8 is a schematic diagram of a structure of a connection between a SoC and a programmable logic control unit.

For example, refer to FIG. 8. FIG. 8 is a schematic diagram of a structure of a connection between a SoC and a programmable logic control unit. As shown in FIG. 8, the programmable logic control unit leads out three signal lines (a signal line 1, a signal line 2, and a signal line 3), which are respectively connected to the pin 1, the pin 2, and the pin 3 of the SoC. After being powered on, the programmable logic control unit runs code, and a value of a register in the programmable logic control unit is set to 0x000. Then, the programmable logic control unit controls, based on the value of the register, the signal line 1, the signal line 2, and the signal line 3 to output low-level signals. In this case, after being powered on, the SoC reads level values of the pin 1, the pin 2, and the pin 3, to obtain that the level values of the pin 1, the pin 2, and the pin 3 are low, low, and low respectively. Based on the mapping relationship shown in Table 3, the SoC converts the level values of the three pins into an algorithm selection identifier (that is, 000), and then determines, based on a value of the algorithm selection identifier, to verify the boot firmware by using the post-quantum cryptographic algorithm.

In Implementation 3, to facilitate switching of the verification algorithm used by the electronic device in the boot process, this embodiment also provides a manner of changing the algorithm selection identifier.

Optionally, in the running phase of the electronic device, the electronic device obtains a code update request. The code update request is for requesting to update the code run by the programmable logic control unit. Then, the electronic device verifies the code update request, and executes the code update request when verification on the code update request succeeds, to update the code run by the programmable logic control unit. The programmable logic control unit runs the code to control the level value of the output signal that is output to the at least one pin. Therefore, the level value of the signal that is output by the programmable logic control unit to the at least one pin of the SoC can be changed through update of the code run by the programmable logic control unit, so that the SoC obtains an updated algorithm selection identifier.

Optionally, in the running phase of the electronic device, an execution body that is configured to obtain the code update request and execute the code update request is a processing apparatus connected to the programmable logic control unit. The processing apparatus is, for example, a central processing unit (CPU), a network processor (NP), a microcontroller unit (MCU), or another SoC.

Figure 9:
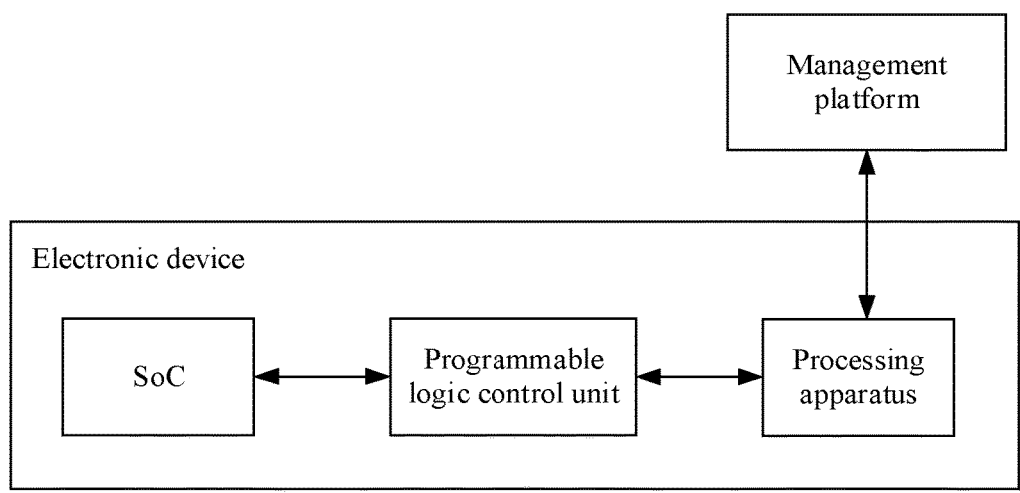
FIG. 9 is a schematic diagram of a structure of an electronic device.

For example, refer to FIG. 9. FIG. 9 is a schematic diagram of a structure of an electronic device. As shown in FIG. 9, in the electronic device, the SoC is connected to the programmable logic control unit, the programmable logic control unit is further connected to the processing apparatus, and the processing apparatus is further connected to the management platform outside the electronic device.

Figure 10:
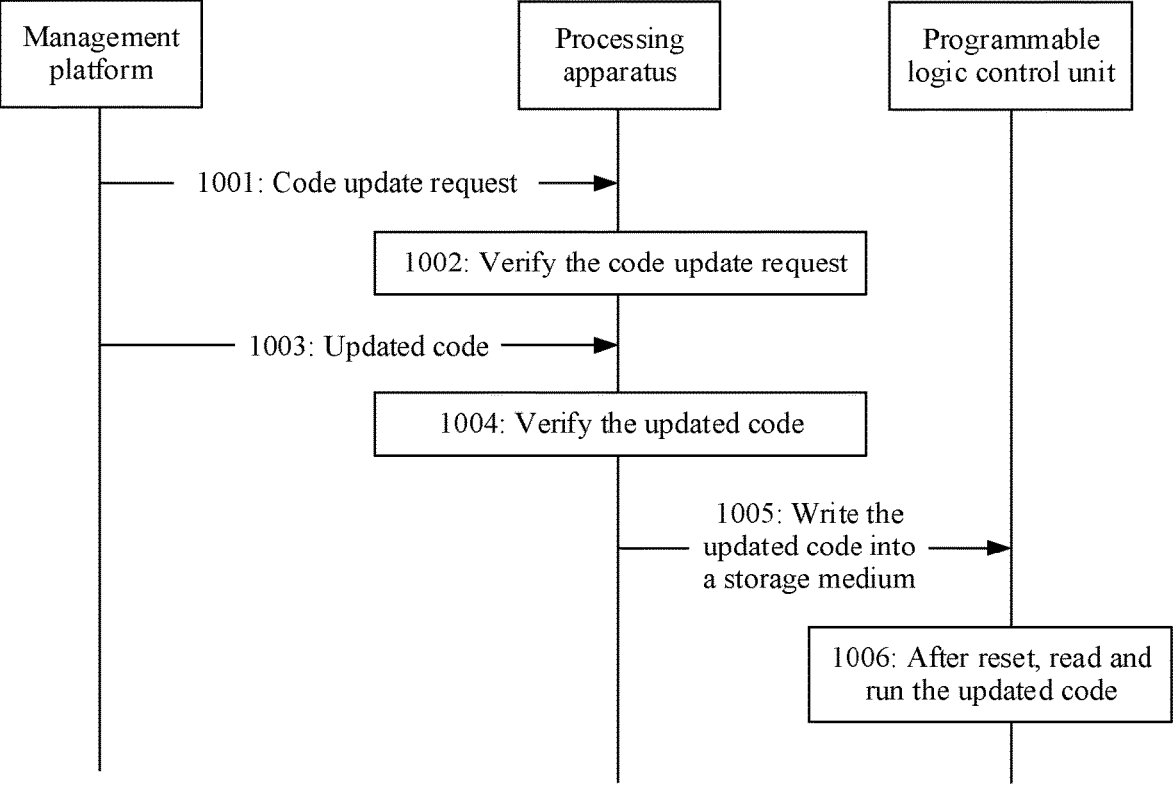
FIG. 10 is a schematic flowchart of updating code in a programmable logic control unit.

For example, refer to FIG. 10. FIG. 10 is a schematic flowchart of updating code in a programmable logic control unit. As shown in FIG. 10, a process of updating the code in the programmable logic control unit includes the following steps 1001 to 1006.

Step 1001: The management platform sends the code update request to the processing apparatus in an electronic device.

When the manager delivers an instruction to the management platform to instruct the management platform to trigger update of running code of the programmable logic control unit in the electronic device, the management platform sends the code update request to the processing apparatus in the electronic device. The code update request is, for example, used to request the processing apparatus to update the running code of the programmable logic control unit in the electronic device.

Step 1002: The processing apparatus verifies the code update request.

To prevent attackers from maliciously modifying the boot firmware in the electronic device, after receiving the code update request, the processing apparatus verifies validity of the code update request.

Optionally, the processing apparatus verifies the identity of the management platform to verify the code update request. When verification on the identity of the management platform succeeds, it indicates that verification on the code update request succeeds. When verification on the identity of the management platform cannot succeed, it indicates that verification on the code update request cannot succeed.

Step 1003: After verification on the code update request succeeds, the management platform sends updated code to the processing apparatus.

Step 1004: The processing apparatus verifies the updated code.

In a process in which the processing apparatus verifies the updated code, the processing apparatus performs secure communication with the management platform by using the TLS protocol, obtains a public key of the RSA cryptographic algorithm from the management platform, and verifies a digital signature in the updated code by using the public key, to verify the updated code.

Step 1005: After verification on the updated code succeeds, the processing apparatus writes the updated code into a storage medium that stores the running code of the programmable logic control unit.

The processing apparatus may write the updated code into the storage medium that is used to store the running code of the programmable logic control unit, so as to overwrite the code that is not updated with the updated code.

Step 1006: After being reset, the programmable logic control unit reads and runs the updated code, so as to output signals with different level values to at least one pin of the processing apparatus.

Optionally, in the running phase of the electronic device, an execution body that is configured to obtain the code update request and execute the code update request may alternatively be the SoC connected to the programmable logic control unit. In other words, in the running phase, the SoC obtains and executes the code update request to update the code run by the programmable logic control unit. In the boot phase, the SoC obtains the level value of the signal output by the programmable logic control unit to determine an algorithm for verifying the boot firmware.

Figure 11:
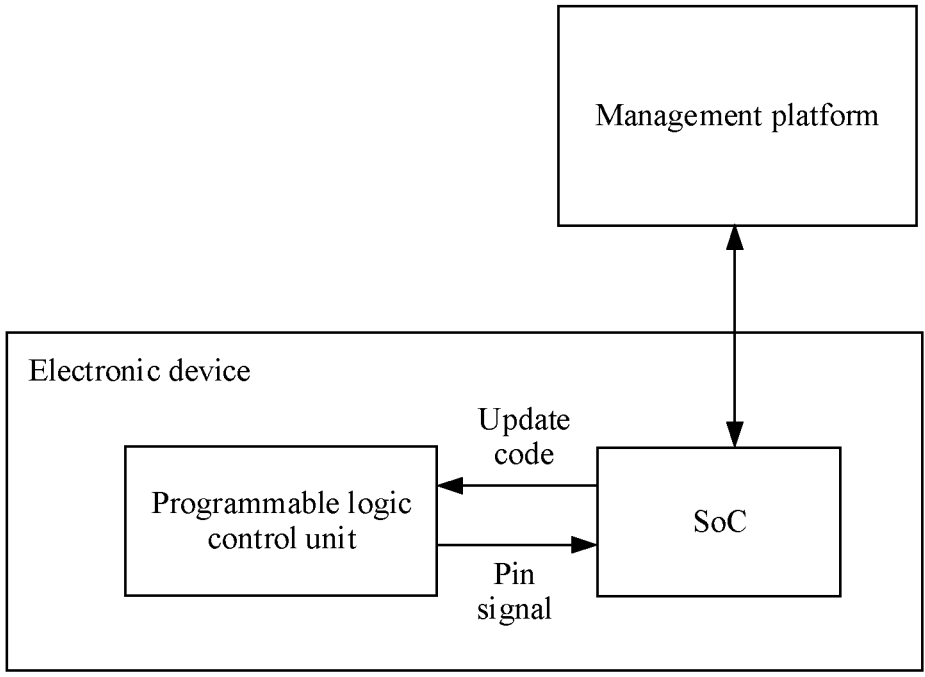
FIG. 11 is a schematic diagram of a structure of another electronic device.

For example, refer to FIG. 11. FIG. 11 is a schematic diagram of a structure of another electronic device. As shown in FIG. 11, in the electronic device, the SoC is connected to the programmable logic control unit, and the SoC is further connected to the management platform outside the electronic device. In this way, in the running phase, the SoC obtains and executes the code update request sent by the management platform to update code run by the programmable logic control unit. In the boot phase, the SoC obtains the level value of the signal output by the programmable logic control unit to determine an algorithm for verifying boot firmware.

The foregoing describes the boot verification method. The following describes apparatuses configured to perform the boot verification method.

Figure 12:
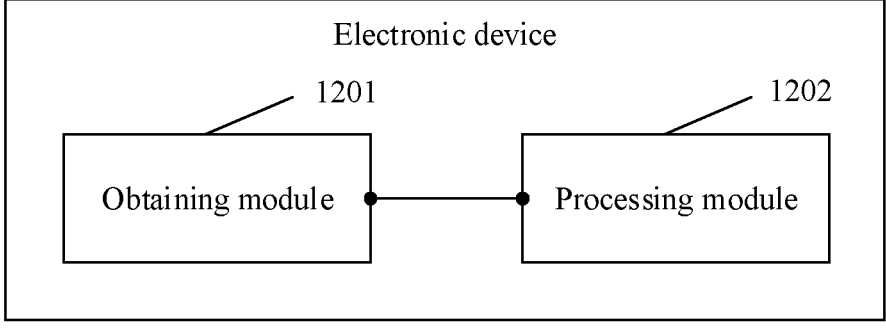
FIG. 12 is a schematic diagram of a structure of an electronic device.

Refer to FIG. 12. FIG. 12 is a schematic diagram of a structure of an electronic device. The electronic device includes an obtaining module 1201, configured to: after the electronic device is powered on, obtain an algorithm selection identifier, where the algorithm selection identifier indicates an algorithm used by the electronic device in a boot phase, and the electronic device supports a plurality of algorithms applied to the boot phase; and a processing module 1202, configured to verify boot firmware based on the algorithm selection identifier by using a target algorithm, where the target algorithm is an algorithm, corresponding to the algorithm selection identifier, in the plurality of algorithms.

In a possible implementation, the algorithm selection identifier is represented with at least one bit, and a value of the at least one bit indicates the algorithm used by the electronic device in the boot phase.

In a possible implementation, the at least one bit is located in a preset storage medium, and the preset storage medium is any one or more of the following storage media: an efuse, an EEPROM, or a flash.

In a possible implementation, in a running phase of the electronic device, the obtaining module 1201 is further configured to receive an identifier update request, where the identifier update request is for requesting to update the algorithm selection identifier in the preset storage medium; and the processing module 1202 is further configured to: when verification on the identifier update request succeeds, execute the identifier update request, to update the value of the at least one bit.

In a possible implementation, the at least one bit is located at a preset location in the boot firmware.

In a possible implementation, the obtaining module 1201 is further configured to receive a firmware update request, where the firmware update request is for requesting to update the boot firmware; and the processing module 1202 is further configured to: when verification on the firmware update request succeeds, execute the firmware update request, to update the boot firmware and the algorithm selection identifier in the boot firmware.

In a possible implementation, the obtaining module 1201 is further configured to: obtain a level value of at least one pin of a SoC in the electronic device, and obtain, based on a preset mapping relationship, the algorithm selection identifier corresponding to the level value, where the mapping relationship indicates a relationship between the level value of the pin and a value of the algorithm selection identifier.

In a possible implementation, the electronic device includes the SoC and a programmable logic control unit; and the at least one pin in the SoC is connected to the programmable logic control unit, and the programmable logic control unit is configured to control a level value of an output signal that is output to the at least one pin.

In a possible implementation, the obtaining module 1201 is further configured to obtain a code update request, where the code update request is for requesting to update code run by the programmable logic control unit; and the processing module 1202 is further configured to: when verification on the code update request succeeds, execute the code update request, to update the code run by the programmable logic control unit, where the programmable logic control unit is configured to run the code to control the level value of the output signal that is output to the at least one pin.

In a possible implementation, the target algorithm includes the post-quantum cryptographic algorithm, the RSA cryptographic algorithm, the elliptic curve cryptography algorithm, the SM2 cryptographic algorithm, the hash algorithm, or the symmetric block cryptographic algorithm.

Figure 13:
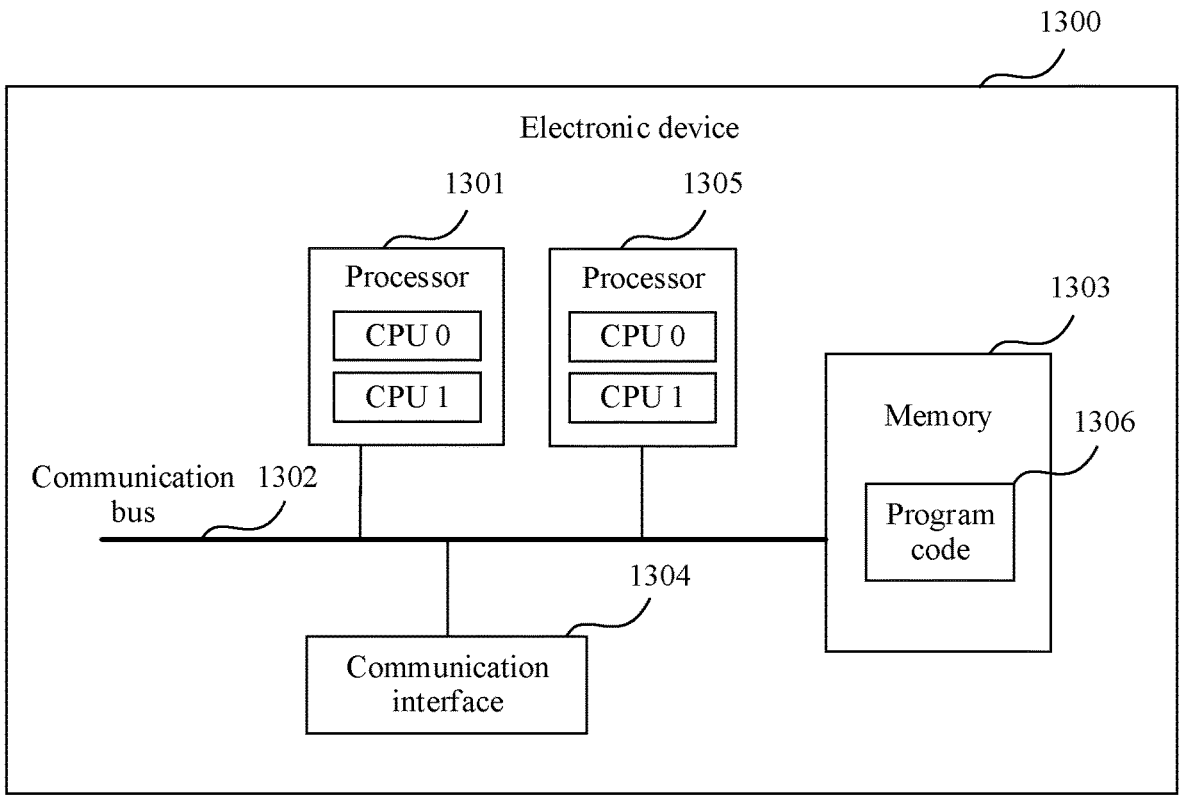
FIG. 13 is a schematic diagram of a structure of an electronic device.

FIG. 13 is a schematic diagram of a structure of an electronic device. As shown in FIG. 13, the electronic device 1300 is equipped with the foregoing boot verification apparatus. The electronic device 1300 is implemented with a general bus architecture.

The electronic device 1300 includes at least one processor 1301, a communication bus 1302, a memory 1303, and at least one communication interface 1304.

Optionally, the processor 1301 is a general-purpose CPU, an NP, a microprocessor, or may be one or more integrated circuits configured to implement the solutions of this disclosure, for example, an application-specific integrated circuit (ASIC), a programmable logic device (PLD), or a combination thereof. The PLD is a complex programmable logic device (CPLD), a field-programmable gate array (FPGA), generic array logic (GAL), or any combination thereof.

The communication bus 1302 is configured to transmit information between the foregoing components. The communication bus 1302 may be classified into an address bus, a data bus, a control bus, and the like. For ease of indication, the communication bus is represented with one bold line in the figure. However, it does not indicate that there is one bus or one type of bus.

Optionally, the memory 1303 is a read-only memory (ROM) or another type of static storage device that can store static information and instructions. Alternatively, the memory 1303 is a random-access memory (RAM) or another type of dynamic storage device that can store information and instructions. Alternatively, the memory 1303 may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of instructions or a data structure and that can be accessed by a computer. However, the memory 1303 is not limited thereto. Optionally, the memory 1303 exists independently, and is connected to the processor 1301 with the communication bus 1302. Optionally, the memory 1303 and the processor 1301 are integrated together.

The communication interface 1304 is configured to communicate with another device or a communication network by using any transceiver-type apparatus. The communication interface 1304 includes a wired communication interface. Optionally, the communication interface 1304 further includes a wireless communication interface. The wired communication interface is, for example, an Ethernet interface. The Ethernet interface may be an optical interface, an electrical interface, or a combination thereof. The wireless communication interface is a wireless local area network (WLAN) interface, a cellular network communication interface, a combination thereof, or the like.

In an implementation, in an embodiment, the processor 1301 includes one or more CPUs, for example, a CPU 0 and a CPU 1 shown in FIG. 13.

In an implementation, in an embodiment, the electronic device 1300 includes a plurality of processors, for example, the processor 1301 and a processor 1305 in FIG. 13. Each of these processors is a single-core processor (single-CPU), or a multi-core processor (multi-CPU). The processor herein may be one or more devices, circuits, and/or processing cores configured to process data (for example, computer program instructions).

In some embodiments, the memory 1303 is configured to store program code 1306 for executing the solutions in this disclosure, and the processor 1301 executes the program code 1306 stored in the memory 1303. In other words, the electronic device 1300 implements the foregoing method embodiments by using the processor 1301 and the program code 1306 in the memory 1303.

Embodiments in this specification are all described in a progressive manner, for same or similar parts in embodiments, refer to each other, and each embodiment focuses on a difference from other embodiments.

That A refers to B means that A is the same as B or A is a simple variant of B.

The terms "first", "second", and the like are intended to distinguish between different objects but do not indicate a particular order of the objects, and cannot be understood as an indication or implication of relative importance. For example, a first rate-limiting channel and a second rate-limiting channel are used to distinguish between different rate-limiting channels, but are not used to describe an order of the rate-limiting channels. It cannot be understood that the first rate-limiting channel is more important than the second rate-limiting channel.

Unless otherwise specified, "at least one" means one or more, and "a plurality of" means two or more.

All or some of the foregoing embodiments may be implemented with software, hardware, firmware, or any combination thereof. When software is used to implement embodiments, all or some of the embodiments may be implemented in a form of a computer program product. The computer program product includes one or more computer instructions. When the computer program instructions are loaded and executed on a computer, all or some of the procedures or functions are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state disk (SSD)), or the like.

The foregoing embodiments are merely intended for describing the technical solutions of this disclosure, but not for limiting this disclosure. A person of ordinary skill in the art should understand that the person may still make modifications to the technical solutions described in the foregoing embodiments or make equivalent replacements to some technical features thereof, and these modifications or replacements do not cause essence of the corresponding technical solutions to depart from the scope of the technical solutions of embodiments of this disclosure.

What is claimed is:

1. A method comprising:
powering on an electronic device;
obtaining, after powering on the electronic device, an algorithm selection identifier that indicates an algorithm used by the electronic device in a boot phase, wherein the algorithm selection identifier indicates which one of a plurality of algorithms supported by the electronic device is to be used for verifying boot firmware of the electronic device; and
verifying the boot firmware based on the algorithm selection identifier by using a target algorithm corresponding to the algorithm selection identifier.

2. The method of claim 1, wherein the algorithm selection identifier comprises at least one bit.

3. The method of claim 2, further comprising storing the at least one bit in a preset storage medium, wherein the preset storage medium is an electric fuse (efuse), an electrically erasable programmable read-only memory (EEPROM), or a flash medium.

4. The method of claim 3, further comprising:
receiving an identifier update request requesting to update the algorithm selection identifier; and
executing the identifier update request to update a value of the at least one bit when verification on the identifier update request succeeds.

5. The method of claim 2, wherein the at least one bit is located at a preset location in the boot firmware.

6. The method of claim 5, further comprising:
receiving a firmware update request to update the boot firmware; and

executing the firmware update request to update the boot firmware and the algorithm selection identifier when verification on the firmware update request succeeds.

7. The method of claim 1, wherein obtaining the algorithm selection identifier comprises:
obtaining a first level value of a pin of a system on chip (SoC) in the electronic device; and
obtaining, based on a preset mapping relationship mapping the algorithm selection to a second level value, the algorithm selection identifier.

8. The method of claim 7, further comprising outputting, by a programmable logic control unit of the electronic device, a second level value to the pin.

9. The method of claim 8, further comprising:
obtaining a code update request requesting to update code run by the programmable logic control unit; and
executing the code update request to update the code when verification on the code update request succeeds, wherein
running the code to control the second level value of the output signal.

10. The method of claim 1, wherein the target algorithm comprises a post-quantum cryptographic algorithm, a Rivest-Shamir-Adleman (RSA) cryptographic algorithm, an elliptic curve cryptography algorithm, an SM2 cryptographic algorithm, a hash algorithm, or a symmetric block cryptographic algorithm.

11. An electronic device comprising:
a memory configured to store instructions; and
at least one processor coupled to the memory and configured to execute the instructions to cause the electronic device to:
obtain, after powering on the electronic device, an algorithm selection identifier that indicates an algorithm used by the electronic device in a boot phase, wherein the algorithm selection identifier indicates which one of a plurality of algorithms supported by the electronic device is to be used for verifying boot firmware of the electronic device; and
verify the boot firmware based on the algorithm selection identifier by using a target algorithm, corresponding to the algorithm selection identifier.

12. The electronic device of claim 11, wherein the algorithm selection identifier comprises at least one bit.

13. The electronic device of claim 12, wherein the at least one bit is stored in a preset storage medium, and wherein the preset storage medium is an electric fuse (efuse), an electrically erasable programmable read-only memory (EEPROM), or a flash.

14. The electronic device of claim 13, wherein the at least one processor is further configured to execute the instructions to cause the electronic device to:
receive an identifier update request for requesting to update the algorithm selection identifier; and
execute the identifier update request to update the value of the at least one bit when verification on the identifier update request succeeds.

15. The electronic device of claim 12, wherein the at least one bit is located at a preset location in the boot firmware.

16. The electronic device of claim 15, wherein the at least one processor is further configured to execute the instructions to cause the electronic device to:
receive a firmware update request to update the boot firmware; and
execute the firmware update request to update the boot firmware and the algorithm selection identifier when verification on the firmware update request succeeds.

17. The electronic device of claim 11, wherein the at least one processor is further configured to execute the instructions to cause the electronic device to:

obtain a first level value of a pin of a system on chip (SoC) in the electronic device; and obtain, based on a preset mapping relationship mapping the algorithm selection to a second level value, the algorithm selection identifier.

18. The electronic device of claim 17, wherein the at least one processor is further configured to execute the instructions to cause the electronic device to output, by a programmable logic control unit of the electronic device, a second level value to the pin.

19. The electronic device of claim 11, wherein the target algorithm comprises a post-quantum cryptographic algorithm, an RSA cryptographic algorithm, an elliptic curve cryptography algorithm, an SM2 cryptographic algorithm, a hash algorithm, or a symmetric block cryptographic algorithm.

20. A non-transitory computer program product comprising instructions that are stored on a computer-readable medium and that, when executed by a processor, cause an electronic device to:

obtain an algorithm selection identifier, after the electronic device is powered on, that indicates an algorithm applied in a boot phase, wherein the algorithm selection identifier indicates which one of a plurality of algorithms supported by the electronic device is to be used for verifying boot firmware of the electronic device; and verify the boot firmware based on the algorithm selection identifier by using a target algorithm corresponding to the algorithm selection identifier.

* * * * *